Nov. 18, 1941.              A. J. FETTIG                2,263,033
                        CALCULATING MACHINE
                       Filed Oct. 31, 1936           3 Sheets-Sheet 1

INVENTOR
Arthur J. Fettig
BY
Davis, Lindsey, Smith & Shonts
ATTORNEYS

Nov. 18, 1941.    A. J. FETTIG    2,263,033
CALCULATING MACHINE
Filed Oct. 31, 1936    3 Sheets-Sheet 3
Fig. 5.
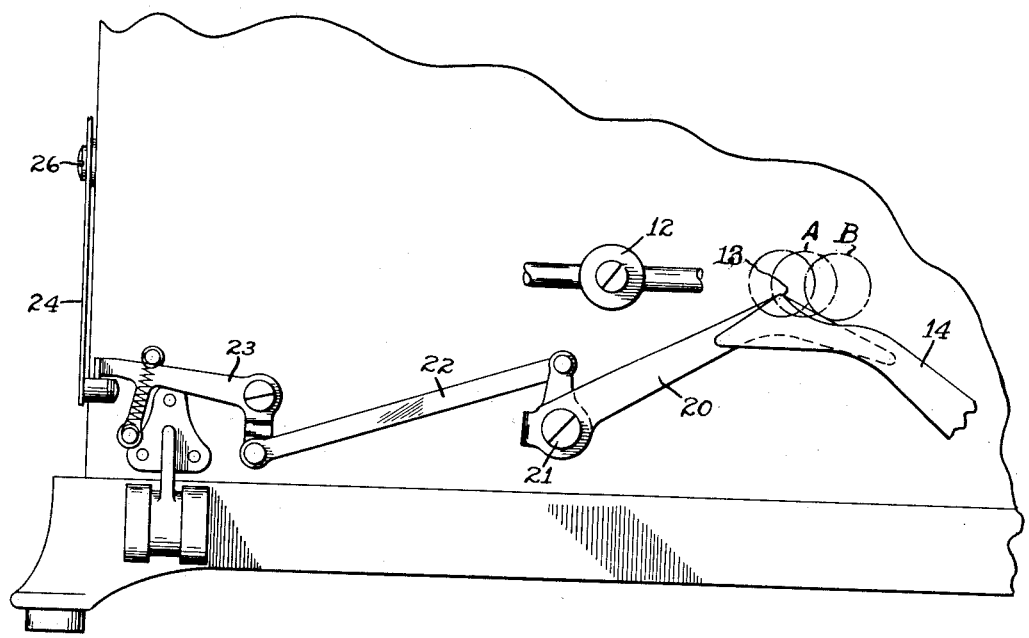
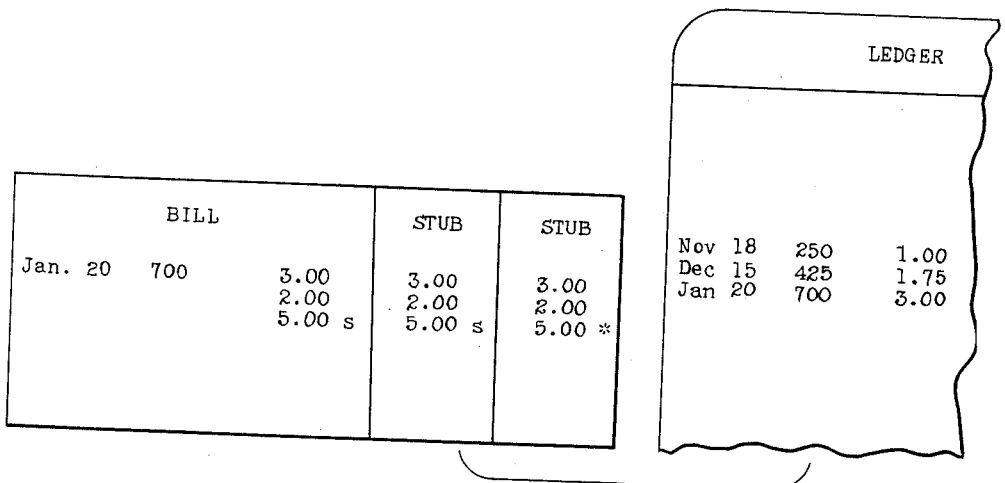
Fig. 6.
INVENTOR
Arthur J. Fettig
BY
Davis, Lindsey, Smith & Shonts
ATTORNEYS Patented Nov. 18, 1941

2,263,033

UNITED STATES PATENT OFFICE 2,263,033

CALCULATING MACHINE

Arthur J. Fettig, Detroit, Mich., assignor to Burroughs Adding Machine Company, Detroit, Mich., a corporation of Michigan Application October 31, 1936, Serial No. 108,529

5 Claims. (Cl. 235—60)

This invention relates to a calculating machine capable of automatically performing repeat operations and more particularly to the controls for automatic repeat mechanisms. The invention is particularly applicable to a Burroughs machine of the general type illustrated in Muller Patent 1,397,774 and is directed toward improving the machine illustrated in this patent.

It is an object of this invention to provide improved controls for the machine whereby the repeat operations of the machine may be controlled in accordance with predetermined positions of the paper carriage.

Other objects and resulting advantages will be apparent from the following description given in connection with the drawings, in which—

Fig. 5 is a partial rear elevation illustrating the carriage control mechanism, and Fig. 6 is an illustration of one type of work that may be performed by a machine embodying this invention.

Figure 1:
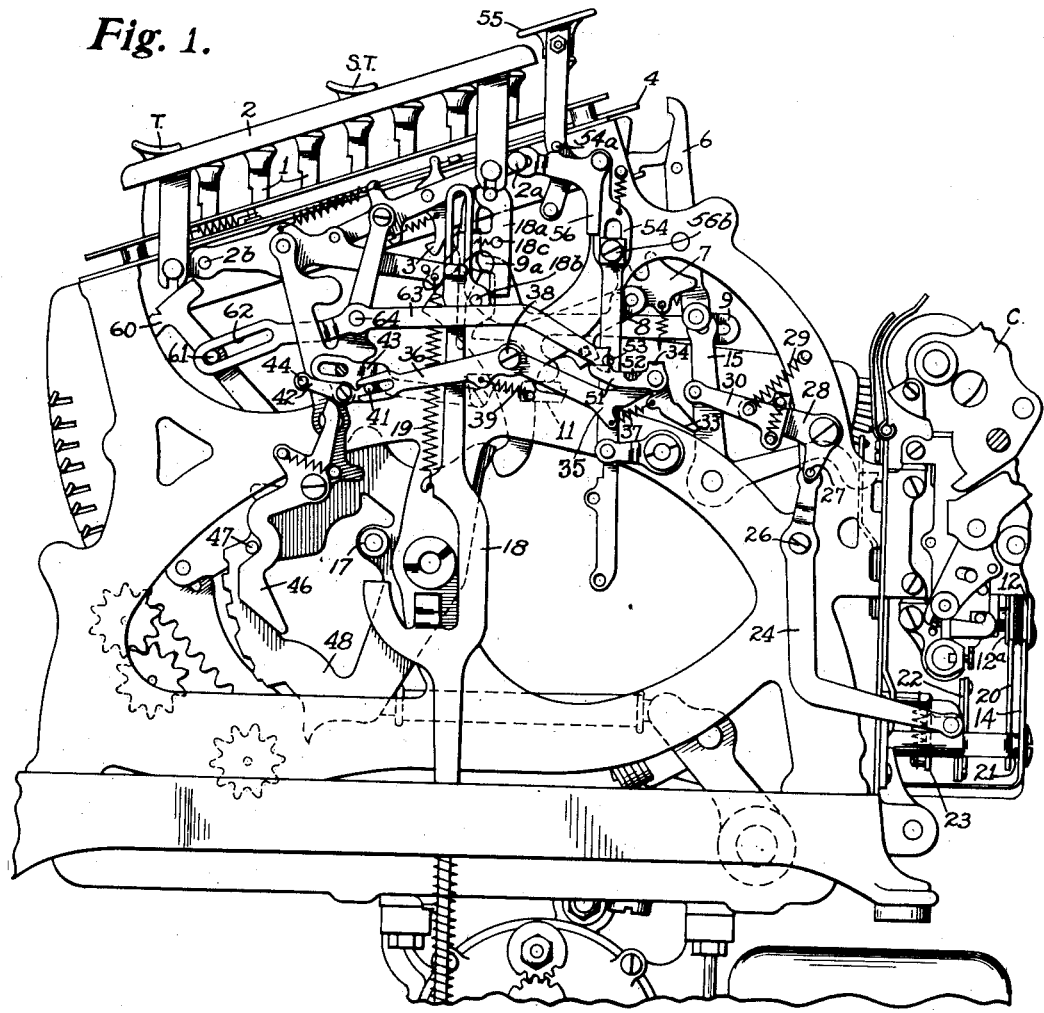
Figure 1 is a right side elevation of a machine embodying this invention with the parts in normal position.

The invention will probably be better understood by first describing one type of entry or the work that may be performed by the machine. For this purpose, reference will be had to Fig. 6, which illustrates a public utility bill upon the left side and the corresponding ledger sheet upon the right side, both of which receive the desired entries; that is, both papers are inserted in the carriage at the same time, and the machine is automatically given sufficient repeat cycles of operation to print the desired transaction on both forms. The first item entered on the bill is Jan. 20         700         3.00

This item represents a consumption of 700 units of either gas or electricity at the consumer's price of $3.00, all of which is printed at one operation of the machine. The carriage then tabulates automatically into columns 2 and 3 of the bill where the amount only is printed upon the two stub sections of the bill, the other figures being omitted because of a variable hammer block mechanism. The carriage then automatically tabulates to the fourth columnar position of the carriage or the first column of the ledger sheet where the full entry, including the date, consumption and rate, is reprinted. The items on the ledger preceding the entry are, of course, preceding entries made on the ledger sheet for this particular account, to which the last entry is to be added.

The automatic tabulation of the carriage and the automatic repeat printing are accomplished by mechanisms similar to those disclosed and described in the heretofore-mentioned Muller patent; that is, after the operator makes one entry and without further manipulation by the operator, the repeat mechanism causes the machine automatically to go through a series of operations and to reprint in each of the columns, until the amount is printed on the ledger card, after which the repeat mechanism is disabled and other amounts may be printed on the ledger card through a manual operation, or the carriage may be returned for a second entry on the bill.

In the illustrated form, the carriage is returned for a second entry of $2.00 on the bill. This entry may represent an overdue amount or a sale of other commodities such as would not be itemized on the ledger sheet. Accordingly, the machine should not automatically make repeat operations beyond the second and third or stub columns of the bill. Therefore, it is necessary to disable the repeat mechanism so that, when the $2.00 entry is made in column 1, the machine will automatically proceed only to the third column of the bill and not to the fourth column or ledger sheet column.

The present invention makes provision for this by providing a suitable control by which the operator can, when he enters the $2.00 amount, control the machine so that it will automatically tabulate and repeat print in columns 2 and 3 of the bill and then stop or return to column 1.

When making the $2.00 entry, the operator is aware of the fact that this item should not be entered on the ledger and, therefore, instead of pressing the usual motor bar, he depresses the auxiliary motor bar which, in conjunction with certain carriage controls, causes the machine automatically to tabulate and repeat print in columns 2 and 3, after which the repeat mechanism is disabled. This mechanism will be described later in detail.

Referring again to the illustrated sample of work, it will be observed that the third entry on the bill is a total of the two items of $3.00 and $2.00 and is, of course, a sub-total in columns 1 and 2 and the total in column 3. This entry like the $2.00 entry should not be entered on the ledger sheet, and, accordingly, means are provided in the present machine whereby depression of the total key with the carriage in column 1 and in conjunction with carriage control, causes the machine to repeat print in columns 2 and 3, after which the repeat mechanism is disabled. This mechanism will be described later in detail.

The present machine embodies much of the mechanism shown and described in Muller Patent 1,397,774. The Muller patent illustrates what is generally known as a Burroughs motor driven high keyboard machine which is provided with an automatic repeat mechanism. As in the machine of the Muller patent amounts may be entered by depression of the amount keys 1 (Fig. 1) and the main motor bar 2. Totals may be taken by depressing either the total key T, or the subtotal key ST, all in the usual manner. The machine is provided with a paper carriage C which automatically tabulates from column to column as the machine is operated. The motor bar 2 is latched in depressed position by a hook or latch 3 (130 in the Muller patent). The latch 3 is releasable by slide 4 which is engaged by a lever 6, which is in turn actuated by the release pawl 7 (623 in the Muller patent) carried by a lever 8. Movement of the latter is controlled by a repeat slide 9 (115 in the Muller patent) which slide is controlled by the carriage, to cause repeat operations when the carriage is in certain predetermined columnar positions.

Figure 2:
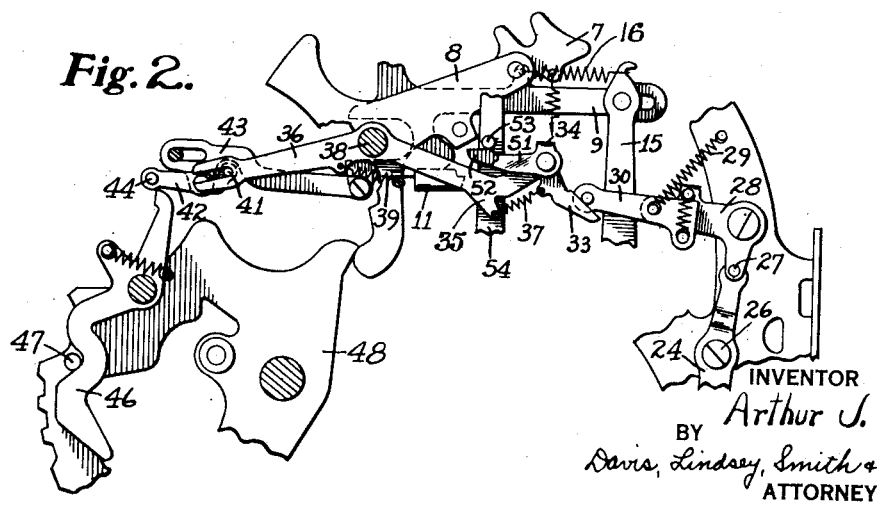
Fig. 2 is a partial elevation illustrating the carriage control of the repeat mechanism in active position but ineffective because of the improved controlling devices.

When the paper carriage occupies a columnar position immediately preceding a columnar position where the machine is to perform an automatic cycle of operation, a repeat control roll 12 on the upper carriage occupies the middle dot-dash line position A of Fig. 5 relative to a repeat control lever 14. For the example of work illustrated in Fig. 6, four repeat control rolls 12 are employed, one for each column, and those for the first three columns are positioned on the carriage so that, when the carriage is at rest in any of the first three columnar positions, the roll for that column occupies the middle dot-dash line position A of Fig. 5 relative to the lever 14. In this position, the roll 12, acting through the lever 14 and known linkage (as shown in Fig. 2ª of the Muller Patent No. 1,397,774) and crank 15, positions the slide 9 so that a shelf 11 limits clockwise movement of the lever 8 and thus prevents the pawl 7 from actuating the lever 6 and slide 4 to release the latch 3. As described in said Muller patent, when the repeat control roll 12 occupies the above-mentioned position A, it functions to prevent release of the latch 3 and release of depressed keys during the cycle of operation. During the cycle of operation, a roller stud 17 (Fig. 1) on the full-stroke sector 48 depresses the clutch control link 18 against the tension of its spring 19 to its normal position, releasing the clutch and permitting the link 18 to be latched down by a pivoted latch member 18ª engaging over a stud 18ᵇ on said link, as also described in said Muller patent, this action being completed at the end of the forward stroke or first half of the cycle. During the return stroke or second half of the cycle, the carriage is tabulated and as it nears the next columnar position another repeat control roll 12 rides over the apex 13 of the lever 14, depressing the latter and moving the slide 9 rearward to such an extent that an upstanding finger 9ª on the forward end of the slide engages a stud 18ᶜ on the latch member 18ª and rocks the latter to unlatch the clutch control link 18 as described in said Muller patent. As the motor bar has remained latched in depressed position, the link 18 is raised by the spring 19 and the clutch is re-engaged to give the machine another cycle of operation.

Another repeat roll 12 is provided for each successive columnar position where an automatic repeat operation is desired. For the last successive column in which an automatic repeat operation is desired, which is the first column on the ledger sheet in the example of work illustrated in Fig. 6, the repeat roll is so positioned that, as the carriage nears that columnar position, the corresponding roll 12 passes over the apex 13 of the lever 14 to initiate the automatic repeat cycle of operation but, when the carriage comes to rest, the roll 12 occupies the dot-dash line position B of Fig. 5 where it allows the lever 14 to return to its normal position so that the repeat slide 9 is in a forward position where the shelf 11 is ineffective to prevent release of the keys and release of the latch 3 during the cycle of operation. The foregoing repeat mechanism is essentially the same as disclosed in said Muller Patent No. 1,397,774 and in Muller Patents Nos. 1,942,216 and 2,012,317.

The mechanism so far described provides for automatic tabulation of the carriage and automatic repeat operations of the machine, whereby entries may be made in column 1 and the machine will automatically function thereafter to repeat the printing of the amount only in columns 2 and 3 of the bill and of the entire transaction in column 4 or the first column on the ledger sheet. As previously mentioned, it is also desirable to be able to enter amounts only in the three columns of the bill, and thereafter disable the repeat mechanism so that the items are not entered on the ledger sheet, and to accomplish this without disturbing the machine, and yet in such a manner that the repeat operations will not be carried through into the ledger sheet when desired. For this purpose, certain operation-control keys, such as the total key and the auxiliary motor bar are used in conjunction with carriage control, whereby the machine may be caused to perform a repeat operation in column 4 or may be caused to automatically disable the repeat mechanism so that the carriage does not tabulate into column 4 and does not repeat print in that column.

For this purpose an additional carriage control lever 20 (Fig. 5) is employed at the rear of the machine in position to be engaged by roll 12ª (Fig. 1) in column 3. This roll is similar to roll 12 that is positioned to engage lever 14, and is positioned to engage a lever 20. Lever 20 is pivoted to the rear of the machine at 21 and is connected to a link 22 which is connected to one end of a pivoted bell crank 23, the other end of which engages a second bell crank 24, pivoted to the side of the machine at 26. The upper end of crank 24 has a pin and slot connection 27 (Fig. 2) with one arm of the bell crank 28 also pivoted to the side frame of the machine and urged clockwise by spring 29. The arrangement of the foregoing elements is such that, when the carriage enters column 3, roll 12ª lowers crank 20 which rocks crank 23 counter-clockwise (Fig. 5), which rocks crank 24 clockwise (Fig. 1), which in turn rocks crank 28 counter-clockwise.

The forward arm of crank 28 carries an extension 30 pivoted thereto and spring urged in a counterclockwise position. The extension extends sufficiently forward to engage a rear arm 33 of a yoke 34 under certain conditions as will be hereinafter described. Yoke 34 is pivotally carried upon the rear end of lever 35 and is urged clockwise and out of engagement with extension 30 by a spring 37. Lever 35 is pivoted to a stationary portion of the machine at 38 and is urged counter-clockwise by a spring 39. The forward end 36 of lever 35 has a pin and slot connection 41 with a pawl 42 pivotally carried by the forward end of a link 43, the rear end of which is connected to slide 9. The forward end of pawl 42 carries a stud 44 adapted, when in lowered position (Fig. 3) to be engaged by the upper end of a pivoted lever 46. A stud 47 on the full-stroke sector 48 acts early in the cycle of machine operation on a lower cam portion of lever 46 to rock said lever counterclockwise. If the stud 44 is at this time in front of the upper end of the lever 46, the pawl 42, the link 43, and the slide 9 with the shelf 11 are pulled forward in time to permit the lever 8 to move clockwise far enough so that the pawl can actuate the lever 6 and slide 4 to release the motor bar latch 3 during the return stroke of the cycle. The lever 35 which controls the pawl 42 is controlled in part by the paper carriage through crank 28 and in part by certain operation-control keys as will now be explained.

Yoke 34 which is normally held out of engagement with extension 30 by spring 37 has two forwardly extending arms 51 and 52. Arm 52 is adapted to be engaged by a stud 53 (Fig. 2) carried by the lower vertical stem portion 54 of an auxiliary motor bar 55. A stud 54ª on the stem 54 of the auxiliary motor bar 55 overlies the forward arm of a bell crank 56 pivoted on the stem 54. The forward end of this arm of the bell crank 56 has a slot receiving a stud 2ª on the rear end of one of the levers supporting the stems of the main motor bar 2 so that, when the auxiliary motor bar 55 is depressed, the main motor bar also is depressed. When the motor bars are in normal positions, the lower end of the lower arm of the bell crank 56 is slightly above and forward of a fixed squared stud 56ᵇ on which the stem 54 is guided but, when the main motor bar is depressed, the bell crank is rocked counterclockwise to place the end of its lower arm over the stud 56ᵇ which then prevents depression of the auxiliary motor bar until the main motor bar has been restored. When the auxiliary motor bar 55 is depressed, the bell crank 56 is moved downward with its lower arm in front of the stud 56ᵇ and by its connection with the stud 2ª holds the auxiliary motor bar depressed until the latch 3 is tripped and the main motor bar returns to normal position. When the auxiliary motor bar is depressed, the stud 53 depresses arm 52 and rocks yoke 34 counterclockwise. This rocking of yoke 34 moves lower arm 33 into position to be engaged by extension 30 when the latter is lowered as, and not before, the carriage enters column 3.

Figure 3:
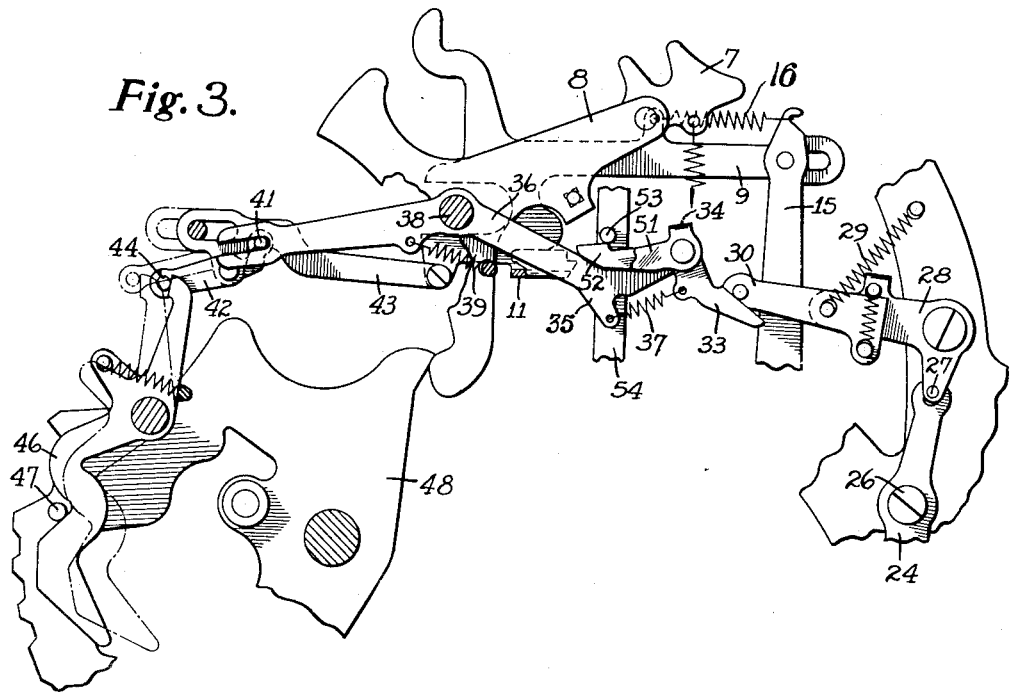
Fig. 3 is a view similar to Fig. 2, illustrating the controlling devices operative to disable the automatic repeat mechanism.

Accordingly, when the carriage is in column 3 and the auxiliary motor bar has been depressed, lever 36 will be rocked clockwise, thus swinging pawl 42 counter-clockwise and placing stud 44 in the path of the lever 46 (Fig. 3). Therefore, when the machine is given a stroke of operation after the carriage has reached the third columnar position, repeat slide 9 is moved forwardly during the early part of the machine operation and moves shelf 11 forward to permit full operation of release pawl 7. In other words, the repeat mechanism is disabled and the repeat operations of the machine are stopped.

The operator, in entering the second amount of $2.00 in the first column of the bill, knowing that the amount is not to be entered on the ledger, depresses the auxiliary motor bar instead of the main motor bar. The machine will then repeat print this item in columns 2 and 3 but will not repeat print the item in column 4 on the ledger sheet.

An additional control of the repeat print mechanism is also provided and, for this purpose, the lever 60 (Figs. 1 and 4) associated with the total key T and the subtotal key ST, as disclosed in the Kilpatrick Patent 928,981, and corresponding to lever 14ᵇ of said patent is utilized. This lever 60 is rocked rearwardly when the total key T or subtotal key ST is depressed as disclosed in said Kilpatrick patent and is provided with a stud 61. This stud engages in a slot 62, formed in the rear end of a lever 63, pivoted at 64. Lever 63 extends rearwardly and carries a stud 66 which is adapted to engage the other arm 51 of yoke 34. Accordingly, each time either of the total keys T or ST is depressed, lever 60 is rocked clockwise and lever 63 is rocked clockwise to depress arm 51 (Fig. 4) and rock yoke 34 counterclockwise. This places the yoke in operative relation to the extension 30 with the results previously described.

Accordingly, when the operator takes a total, such as the third item of the bill, he depresses the total key and upon machine operation, the machine automatically tabulates through the three columns and repeat prints the total in each of these columns. In columns 1 and 2 of the illustrated form, the totals are printed as sub-totals because of the use of non-add carriage control rolls in these columns, as described in the Muller Patent No. 2,087,542, to which reference is also made for further description of the repeat mechanism. When the carriage reaches the third column where there is no non-add roll, the total is printed as a final total. Because of this mechanism, it is only necessary to depress the total key once, after which the machine will automatically perform the necessary operations. Of course, the sub-totals could be printed in columns 1 and 2 by depressing the sub-total key when the carriage is in these columns. After the carriage reaches the third column, the repeat mechanism is disabled as previously described, and the total is not entered in the fourth column or on the ledger sheet.

Figure 4:
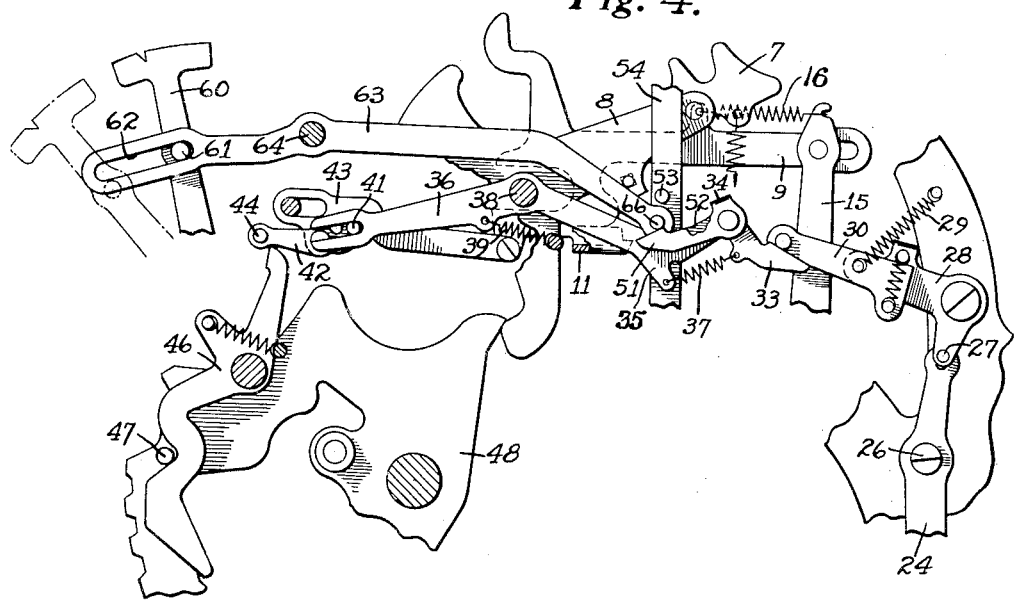
Fig. 4 is a partial side elevation illustrating the control from the total key.

When the total key T or subtotal key ST is depressed and the lever 60 is thereby rocked clockwise, as above mentioned, to the full-line position of Fig. 4, the upper end of said lever 60 is moved from a position forward of a stud 2ᵇ on one of the levers supporting the stems of the main motor bar 2 to a position rearward of said stud 2ᵇ which, upon depression of the main motor bar, is then moved down in front of the upper end of lever 60 and holds the depressed total key T or subtotal key ST against return to normal until the latch 3 is tripped and the motor bar 2 is permitted to return to normal. Thus, if the total key is depressed for printing the total in the first column of the bill in the example of work illustrated in Fig. 6, the key will be held down while the total is printed in all three columns on said bill but will return to normal when the motor bar 2 is unlatched and returns to normal in the latter part of the total-printing cycle in the third column.

From the foregoing description, it will be apparent that the present invention provides a combination of controls whereby a carriage control is employed to cause repeat operations of the machine in certain predetermined positions of the carriage and furthermore special controls are provided whereby, in conjunction with a carriage control and depression of certain other keys, with the carriage in one position, the repeat mechanism is disabled in certain other predetermined positions of the carriage. If either of the special controls, such as the total keys or the auxiliary motor bar, is operated independently, that is, in a column in which there is no control roll, the repeat mechanism is not affected in any way; but, when these keys are depressed in a column in which a control roll 12a is employed, the repeat mechanism is disabled. Of course, if the main motor bar is in depressed position in a column where there is a repeat roll 12, the repeat mechanism operates to cause repeat operations of the machine, the yoke 34 then remaining in ineffective position.

It will be apparent to those skilled in the art that other uses of the foregoing invention than the one illustrated form may be employed, and that minor changes may be made in the details of construction without departing from the spirit and scope of the invention as defined in the claims.

I claim:

1. A calculating machine having a power drive means, means operable manually to cause said power drive means to give the machine a cycle of operation, a device normally moved automatically to successive positions during successive cycles of operation of the machine, an automatic repeat mechanism controlled by said movable device in accordance with the position thereof to cause said drive means to give the machine a predetermined number of automatic cycles of operation following a manually initiated cycle, manipulative control means, and means rendered effective by said manipulative control means and by said movable device in accordance with the position of the latter to cause said repeat means to cause said drive means to give the machine a lesser predetermined number of automatic cycles of operation and then stop said automatic cycles.

2. A machine of the class described, having a paper carriage movable to a series of columnar positions, a power drive means, means operable when the paper carriage is in a predetermined position of said series to cause said power drive means to give the machine a cycle of operation, means operated automatically during a cycle of operation of the machine to move said paper carriage to the next position in said series, an automatic repeat mechanism controlled by said paper carriage to cause said drive means to give the machine an automatic cycle of operation when the paper carriage occupies each of a plurality of successive positions of said series following said predetermined position, manipulative means operable when the paper carriage is in said predetermined position, and means rendered effective by said mainpulative means and by said paper carriage to disable said repeat means from causing said drive means to give the machine an automatic cycle of operation when the paper carriage reaches one of said following positions subsequent to the first of said following positions.

3. A machine of the class described, having a paper carriage movable to a series of columnar positions, a power drive means, manipulative means operable when the paper carriage is in a predetermined position of said series, control means operable by said manipulative means to cause said power drive means to give the machine a cycle of operation, means operated automatically during a cycle of operation of the machine to move said paper carriage to the next position in said series, an automatic repeat mechanism controlled by said paper carriage to cause said drive means to give the machine an automatic cycle of operation when the paper carriage occupies each of a plurality of successive positions of said series following said predetermined position, a second manipulative means operable when the paper carriage is in said predetermined position to operate said control means to cause said drive means to give the machine a cycle of operation, and means rendered effective by said second manipulative means and by said paper carriage to disable said repeat means from causing said drive means to give the machine an automatic cycle of operation when the paper carriage reaches one of said following positions subsequent to the first of said following positions.

4. A machine of the class described, having a paper carriage movable to a series of columnar positions, a power drive means, means operable when the paper carriage is in a predetermined position of said series to cause said power drive means to give the machine a cycle of operation, means operated automatically during a cycle of operation of the machine to move said paper carriage to the next position in said series, an automatic repeat mechanism controlled by said paper carriage to cause said drive means to give the machine an automatic cycle of operation when the paper carriage occupies each of a plurality of successive positions of said series following said predetermined position, manipulative means operable when the paper carriage is in said predetermined position, a member operated automatically during a cycle of operation of the machine, and means conditioned by said manipulative means and by said paper carriage for operation by said member in a machine cycle initiated with the paper carriage in one of said following positions prior to the final one of said following positions for disabling said repeat means from causing said drive means to give the machine an automatic cycle of operation when the paper carriage occupies the next of said following positions.

5. A machine of the class described, having a paper carriage movable to a series of columnar positions, a power drive means, a motor bar, means operable by said motor bar when the paper carriage is in the first of said series of successive positions to cause said power drive means to give the machine a cycle of operation, means operated automatically during a cycle of operation of the machine to move said paper carriage to the next position in said series, latch means for latching said motor bar in operated position, latch tripping means operable automatically during a cycle of operation of the machine to trip said latch to release said motor bar, a repeat slide controlling said latch tripping means, carriage controlled means for controlling said repeat slide to disable said latch tripping means when the paper carriage occupies each of the positions of said series prior to the last position of said series, manipulative means operable when the paper carriage is in said first position, and means rendered effective by said manipulative means and by said paper carriage to disable said repeat slide from disabling said latch tripping means when the paper carriage occupies one of said following positions prior to the last of said following positions.

ARTHUR J. FETTIG.